(12) United States Patent
Dicander

(10) Patent No.: US 9,000,340 B2
(45) Date of Patent: Apr. 7, 2015

(54) SYSTEM AND METHOD FOR TRACKING AND GUIDING AT LEAST ONE OBJECT

(75) Inventor: Fredrik Dicander, Mölndal (SE)

(73) Assignee: SAAB AB, Linkoping (SE)

( * ) Notice: Subject to any disclaimer, the term of this patent is extended or adjusted under 35 U.S.C. 154(b) by 298 days.

(21) Appl. No.: 13/521,661

(22) PCT Filed: Jan. 29, 2010

(86) PCT No.: PCT/SE2010/050098
§ 371 (c)(1),
(2), (4) Date: Oct. 29, 2012

(87) PCT Pub. No.: WO2011/093757
PCT Pub. Date: Aug. 4, 2011

(65) Prior Publication Data
US 2013/0206896 A1    Aug. 15, 2013

(51) Int. Cl.
F42B 10/60    (2006.01)
F41G 7/30    (2006.01)
G01S 17/66    (2006.01)
(Continued)

(52) U.S. Cl.
CPC .............. F41G 7/306 (2013.01); F41G 7/303 (2013.01); F42B 10/60 (2013.01); F42B 12/38 (2013.01)

(58) Field of Classification Search
CPC ............ F41G 7/20; F41G 7/30; F41G 7/301; F41G 7/303; F41G 7/306; F41G 7/308; F42B 10/60; F42B 10/62; F42B 10/64; F42B 12/02; F42B 12/36; F42B 12/38

USPC ........ 244/3.1–3.3, 75.1, 76 R, 175, 183–185, 244/189, 190, 194; 342/61–66; 356/3, 4.01, 356/5.01, 5.05, 5.08, 138, 140, 141.1
See application file for complete search history.

(56) References Cited

U.S. PATENT DOCUMENTS 2,930,894 A * 3/1960 Bozeman ...................... 244/3.11
3,557,304 A * 1/1971 Rue et al. ...................... 244/3.14
(Continued)

FOREIGN PATENT DOCUMENTS

EP    0532977 A2    9/1992
FR    2792478 A1 * 10/2000 ............. H04B 10/22
GB    2393056 A    3/2004

OTHER PUBLICATIONS

International Searching Authority, International Search Report for International Application No. PCT/SE2010/050098, mailed Oct. 7, 2010, 5 pages, Swedish Patent Office, Stockholm.
(Continued)

Primary Examiner — Bernarr Gregory
(74) Attorney, Agent, or Firm — Alston & Bird LLP

(57) ABSTRACT

The object of the present invention is to provide an inventive guidance system for tracking and guiding at least one object, wherein said guidance system comprises a base station (1) including an optical imaging system (3) configured to determine the angular position vector of said at least one object (5, 15), an optical communication link for transmitting guidance control commands from said base station (1) to said at least one object (5, 15), and steering means provided on said at least one object (5, 15) for adjusting the direction of said at least one object (5, 15) in response to said guidance control commands. The invention also provides a corresponding guiding method.

22 Claims, 2 Drawing Sheets

(51) Int. Cl.
  *F42B 12/38* (2006.01)
  *F42B 10/00* (2006.01)
  *F41G 7/00* (2006.01)
  *G01S 17/00* (2006.01)

(56) References Cited

U.S. PATENT DOCUMENTS

| | | | | |
|---|---|---|---|---|
| 3,564,134 | A * | 2/1971 | Rue et al. | 244/3.14 |
| 3,567,163 | A * | 3/1971 | Kepp et al. | 244/3.14 |
| 3,598,344 | A * | 8/1971 | Walters et al. | 244/3.11 |
| 3,742,495 | A * | 6/1973 | Diamantides | 342/64 |
| 3,753,538 | A * | 8/1973 | Marsh et al. | 244/3.12 |
| 3,848,830 | A * | 11/1974 | Born | 244/3.16 |
| 3,876,308 | A * | 4/1975 | Alpers | 244/3.16 |
| 3,974,383 | A * | 8/1976 | Chapman | 244/3.11 |
| 4,018,405 | A * | 4/1977 | Baker | 244/3.14 |
| 4,386,848 | A * | 6/1983 | Clendenin et al. | 244/3.13 |
| 4,834,531 | A * | 5/1989 | Ward | 356/5.08 |
| 4,860,968 | A * | 8/1989 | Pinson | 244/3.12 |
| 5,004,185 | A * | 4/1991 | Lockhart et al. | 244/3.14 |
| 5,064,140 | A * | 11/1991 | Pittman et al. | 244/3.13 |
| 5,133,520 | A * | 7/1992 | Daly | 244/3.12 |
| 5,214,584 | A * | 5/1993 | Dingee et al. | 244/3.11 |
| 5,259,568 | A * | 11/1993 | Amon et al. | 244/3.13 |
| 5,308,022 | A * | 5/1994 | Cronkhite et al. | 244/3.14 |
| 5,310,134 | A * | 5/1994 | Hsu et al. | 244/3.12 |
| 5,350,134 | A * | 9/1994 | Crawford | 244/3.16 |
| 5,372,334 | A * | 12/1994 | Cuadros | 244/3.11 |
| 5,443,227 | A * | 8/1995 | Hsu | 244/3.12 |
| 5,478,028 | A * | 12/1995 | Snyder | 244/3.11 |
| 5,685,504 | A | 11/1997 | Schneider et al. | |
| 5,716,032 | A * | 2/1998 | McIngvale | 244/185 |
| 5,855,339 | A | 1/1999 | Mead et al. | |
| 6,142,410 | A * | 11/2000 | Naccache | 244/3.12 |
| 6,349,898 | B1 * | 2/2002 | Leonard et al. | 244/3.15 |
| 6,795,174 | B1 * | 9/2004 | Miller | 356/141.1 |

OTHER PUBLICATIONS

International Searching Authority, Written Opinion for International Application No. PCT/SE2010/050098, mailed Oct. 7, 2010, 6 pages, Swedish Patent Office, Stockholm.

International Preliminary Examining Authority, International Preliminary Report on Patentability including Applicant's Nov. 28, 2011, Response to the Written Opinion for Application No. PCT/SE2010/050098, mailed Dec. 22, 2011, 12 pages, Swedish Patent Office, Stockholm.

* cited by examiner

SYSTEM AND METHOD FOR TRACKING AND GUIDING AT LEAST ONE OBJECT

CROSS REFERENCE TO RELATED APPLICATIONS

This application is a national stage application, filed under 35 U.S.C. §371, of International Application No. PCT/SE2010/050098, filed Jan. 29, 2010, which is hereby incorporated by reference in its entirety.

BACKGROUND OF THE INVENTION

1. Related Field

The present invention relates to the field of guidance systems for tracking and guiding an object, preferably a weapon.

2. Related Art

One type of known weapon system relies on firing numerous shots of unguided projectiles. This type of weapon system that lacks a guidance system suffers from the disadvantages of high risk of collateral damages, difficulties hitting maneuvering targets, need of wind compensation, and high demands on ammunition supply logistics due to the large amount of needed projectiles to achieve appropriate hit probability.

Another type of known weapon system relies on firing guided weapons, which comprises some sort of sensor means for detecting the target position. This type of guided weapon system, which have high target hit probability, suffers from the disadvantages of high cost for each weapon due to the required internal sensor means, for example a radar system, and thus a high system cost of the guidance system.

There is thus a need for an improved guidance system removing the above mentioned disadvantages.

BRIEF SUMMARY

The object of the present invention is to provide an inventive system and method for tracking and guiding at least one object where the previously mentioned problems are partly avoided. This object is achieved by the claimed feature, wherein said guidance system comprises a base station including an optical imaging system, which is configured to determine the angular position vector of said at least one object, an optical communication link for transmitting guidance control commands from said base station to said at least one object, and steering means provided on said at least one object for adjusting the direction of said at least one object in response to said guidance control commands.

Said object is further achieved by the claimed feature, wherein said guiding method comprises the steps of determining the angular position vector of said at least one object by means of an optical imaging system located on a base station, transmitting guidance control commands from said base station to said at least one object by means of an optical communication link, and steering said at least one object in response to said guidance control commands by means of steering means provided on said at least one object.

According to a further advantageous aspect of the invention, said guidance system is suitable for tracking and guiding at least one object to an individual end position, where said at least one object is estimated to coincide with the position of at least one target.

According to a further advantageous aspect of the invention, said base station further comprises an optical lens system, and said optical imaging system comprises an image sensor configured to detect light, in particular infrared IR light, received through said optical lens system According to a further advantageous aspect of the invention, at least one optical transmitter, preferably an IR radiation source, a LED transmitter, or a laser transmitter, is provided on said at least one object, and configured to emit a light beam detectable by said optical imaging system.

According to a further advantageous aspect of the invention, said optical communication link comprises at least one optical uplink transmitter located on said base station, wherein said at least one optical uplink transmitter is a laser transmitter, such as a laser diode, or a LED transmitter, and at least one optical uplink receiver, such as a photo detector, located on said at least one object.

According to a further advantageous aspect of the invention, said optical communication link further includes downlink communication means comprising at least one optical transmitter located on said at least one object, wherein said at least one optical transmitter is a laser transmitter, such as a laser diode, or a LED transmitter, at least one optical downlink receiver located on said base station, wherein said optical communication link is configured to measure the range to said at least one object by calculating the elapsed time between the sending of an interrogator signal from said at least one uplink transmitter and the receipt of a return signal from said at least one optical transmitter.

According to a further advantageous aspect of the invention, said at least one optical transmitter of said at least one object is configured to emit a light beam covering the location of said optical downlink receiver during the trajectory of said at least one object.

According to a further advantageous aspect of the invention, a laser transmitter or LED transmitter located on said at least one object functions both as said at least one optical transmitter for emitting a light beam detectable by said optical imaging system, and said at least one optical transmitter of said optical communication link.

According to a further advantageous aspect of the invention, said optical imaging system further is configured to determine the angular position vector of said at least one target, and said base station further comprises a laser range finder configured to determine the range to said at least one target.

According to a further advantageous aspect of the invention, said guidance system is configured to track and guide multiple objects, wherein each of said multiple objects is guided towards an individual end position determined for each individual object.

According to a further advantageous aspect of the invention, said optical imaging system, said optical communication link, and preferably also said laser range finder are configured to use the same optical lens system.

According to a further advantageous aspect of the invention, said at least one object is a weapon such as a projectile, bomb, rocket or missile, and said steering means preferably comprises vector control, impulse rocket, or aerodynamic steering means, such as at least one rudder, ram air system, air deflecting means, or the like.

According to a further advantageous aspect of the invention, said guidance system further comprises a control system including an object tracker, which receives object angle position vector information from said optical imaging system, and preferably also object range information from said optical communication link, and being configured to estimate object information, such as object position, object heading, and object speed of said at least one object, and an object controller configured to produce guidance control commands for at least one object based upon corresponding estimated object information, and preferably also operator information.

According to a further advantageous aspect of the invention, said control system further includes a target tracker, which receives target angle position vector information from said optical imaging system, and preferably also target range information from said laser range finder, and being configured to estimate target information, such as target position, target speed, and target heading of said at least one target, wherein target information is supplied to the object controller, and wherein the target tracker is configured to transmit launch information to said at least one object launching device for launching said at least one object.

BRIEF DESCRIPTION OF THE FIGURES

The present invention will now be described in detail with reference to the figures, wherein.

DETAILED DESCRIPTION OF THE VARIOUS EMBODIMENTS

In the following one embodiment of the invention is shown and described, simply by way of illustration of one mode of carrying out the invention.

Figure 1:
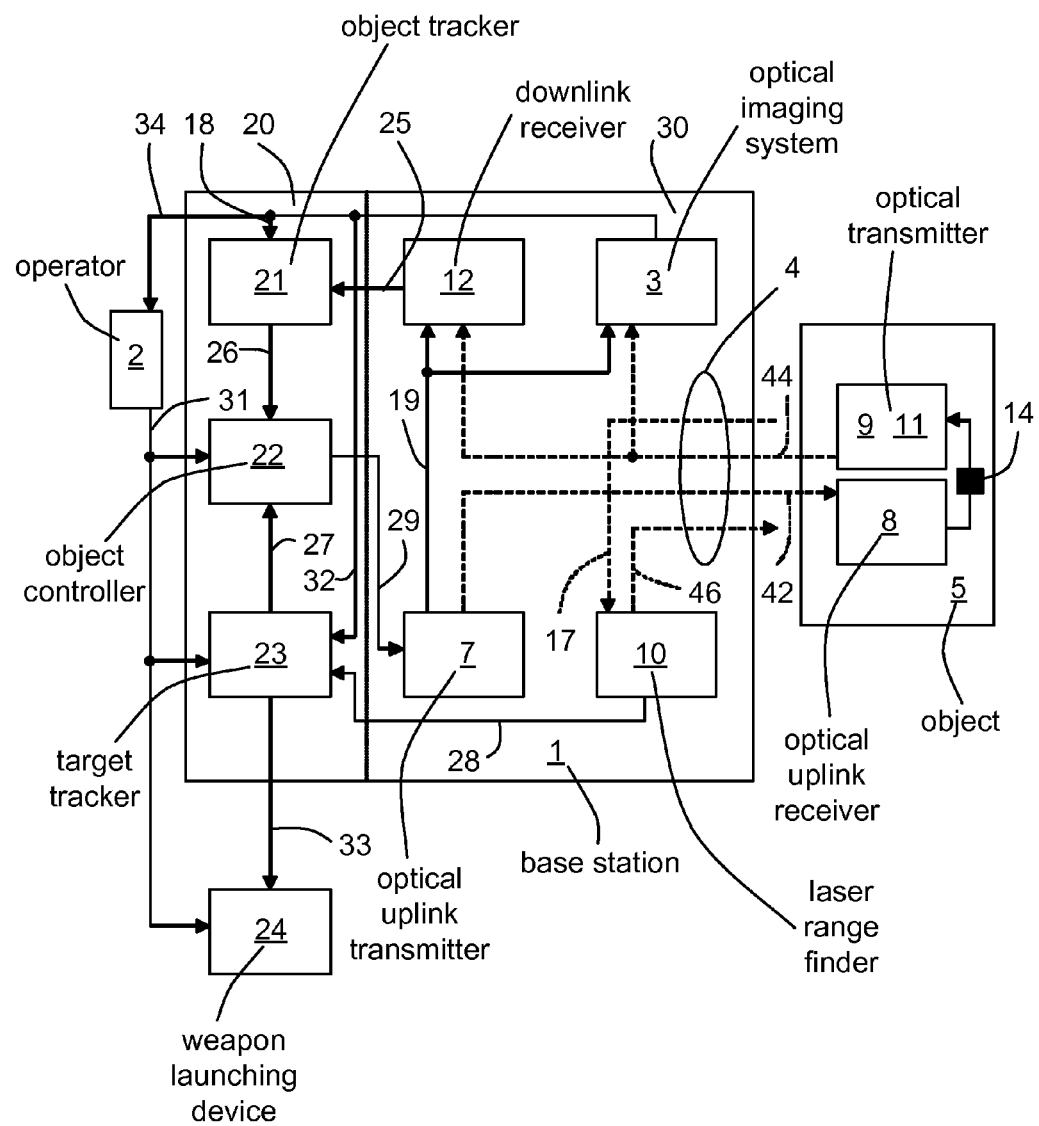
FIG. 1 shows a schematic block diagram of an embodiment of the invention.

FIG. 1 shows an embodiment of the guidance system according to the invention for tracking and guiding an object 5. The guidance system comprises a base station 1, from which the object 5 is controlled. The object 5 can constitute any type of a land-, sea- or air based object capable of responding to guidance control commands received from the base station 1, for example an unmanned aerial vehicle UAV, but the guidance system is particularly suitable for guiding and tracking one or more in-flight weapons, such as projectiles, bombs, rockets and missiles, to an end position, where the weapon is estimated to coincide with a position of a moving or stationary target.

The base station 1 comprises an optical sight 30 for locating the target position. The optical sight 30, for example a FLIR system, comprises an optical imaging system 3 including an image sensor, which is configured to determine an angular position vector of the target with respect to a fixed coordinate system, preferably a horizontally fixed spherical coordinate system. The optical sight can, for example, be provided with inclination sensors for this purpose. The image sensor can be of a charge-coupled device CCD type image sensor, a complementary metal-oxide-semiconductor CMOS type image sensor, or similar type of image sensor.

The optical imaging system 3 is also configured to determine an angular position vector of the object 5 with respect to said coordinate system. The image sensor can be selected to detect light of any suitable wave length depending on the specific object 5 and/or target to be detected. For example, if the object 5 and/or target emit infrared IR light, the image sensor can be selected and configured to be sensitive to IR light spectrum.

To assure good position estimation performance of the object 5 by the optical imaging system 3, an optical transmitter 9 can be provided on the object 5 to emit light, which simplifies detection by the image sensor, such that detection of the object 5 by the optical imaging system 3 is improved. The optical transmitter 9 can be an IR radiation source, a LED transmitter, a laser transmitter, or the like.

One type of IR radiation source comprises an exothermic charge, which can be ignited so that it produces IR radiation visible to the image sensor. Alternatively, the optical transmitter 9 can be LED or laser transmitter, which is configured to emit a light beam towards the image sensor, preferably in the IR light spectrum.

The accuracy of the measured angular position vector of the object 5 is directly dependent on the resolution of the image sensor, and the optical zoom of the optical imaging system 3. The sampling rate of the image sensor can be selected to correspond to the maximal assumed angular velocity of the object 5 and/or target, such that the angular position vector of the object 5 and/or target can be tracked with a sufficiently high degree of accuracy. A standard sampling rate of the image sensor is 50 Hz.

The emitted or reflected light from the object 5 and/or target is received by the image sensor through an optical lens system 4 at the base station 1. The optical lens system 4 determines the angle of view of the optical imaging system 3, which angle of view is selected to fit the specific use of the inventive guidance system. The optical lens system 4 might comprise variable zoom lenses, such that the focal length, and hence the angle of view, of the optical lens system 4 can be altered mechanically to fit the current distance to the object 5, and/or the spread between tracked multiple objects 5.

The guidance system further comprises an optical communication link, which is configured to transmit guidance control commands from the base station 1 to the object 5. For this purpose, the optical communication link comprises an optical uplink transmitter 7, such as a laser transmitter, preferably a laser diode, or a LED transmitter, provided on the base station 1, wherein the light beam emitted by the optical uplink transmitter 7 is preferably aligned with the optical sight 30 and the optical imaging system 3. The light emitted by the optical uplink transmitter 7 is received by an optical uplink receiver 8, such as a photo detector, provided on the object 5.

The optical imaging system 3 and the optical uplink transmitter 7 can advantageously use the same optical lens system 4. In case the guidance system also includes a laser range finder 10 for measuring range to the target position, the light beam 46 emitted by said laser range finder 10 can advantageously also be aligned with the light beam of the optical uplink transmitter 7, and the optical imaging system 3, and use the same optical lens system 4 as the optical imaging system 3 and/or said optical communication link, thereby further contributing to reduced system cost of the guidance system, and simplifying alignment. The range to the target is measured by calculating the time between transmitting of a light beam 46 emitted by the laser range finder 10 towards the target, and the receipt of light reflection 17 from the target.

The object 5 comprises steering means for adjusting the direction of the object 5 in response to the guidance control commands received from the base station 1. In case the object 5 is a weapon such as a projectile, bomb, rocket or missile, the steering means preferably comprises vector control, side impulse rockets, or aerodynamic steering means, such as rudders, ram air systems or other type of air deflecting means.

The above described guidance system controls the object 5 during its path toward its end position, based on the angular position vector of the object 5 determined by the optical imaging system 3. Information of the range to the object 5 from the base station 1 is estimated based upon dead reckoning of the object 5. Accurate range estimation to the object 5 is however an important factor for improved guidance performance, since a disadvantage of dead reckoning is that the position estimation error is cumulative and grows with time. One solution for providing a more accurate estimate of the range to the object 5 is to provide the object 5 with transponder means that will generate a reply signal upon receipt of proper interrogation signal from the base station 1. The optical communication link may additionally be provided with downlink communications means, such that said transponder means may receive and transmit signals with the base station, besides sending auxiliary data from the object 5 down to the base station 1.

Such downlink communication means can be set up by providing the object 5 with an optical transmitter 11 serving as downlink transmitter, wherein the optical transmitter 11 is a laser transmitter, preferably a laser diode, or a LED transmitter, and using the optical imaging system 3 as an optical downlink receiver.

By means of the downlink communication means, the optical communication link is capable of measuring the range to the object 5. This is performed by calculating the elapsed time between the transmitting of an interrogator signal carried by a light beam 42 emitted by the optical uplink transmitter 7 and the receipt of a return signal, which is carried by a light beam 44 emitted by the optical transmitter 11. The optical downlink receiver 3 receives transmitting information 19 from the optical uplink transmitter 7 to perform said range calculation. Due to the limited sampling rate of the image sensor in the optical imaging system 3, it might be necessary, especially in case multiple objects are guided simultaneously, to provide multiple transmit time slots for the objects 5. The time slots can for example be controlled by timing control means 14 at the object 5, which timing control means 14 delay the transmitting of the return signal of the optical transmitter 11 with an individual time period specific for each object 5, such that each individual object 5 can transmit its return signal in an individual time slot. Alternatively, the time slots for transmitting return signals might be controlled by a message comprised in the interrogator signal.

The downlink communication means also provides the possibility to inform the base station 1 of several parameters of the object 5, such as general operational status, error reports, acknowledgement of received guidance control commands, etc.

The laser or LED transmitter located on the object 5 can serve both as said optical transmitter 9 for emitting light simplifying angular position vector determination by said optical imaging system 3, and said optical transmitter 11 of said downlink communication means. Alternatively, separate light transmitting means can be provided for each of said two functions.

Where the object 5 is expected to perform substantial changes in the heading direction during its trajectory toward the end position, neither the light beam 44 emitted by the optical transmitter 9, 11 on the object 5, nor the scope of reception of the optical uplink receiver 8 might not always cover the base station 1, such that guidance control commands transmitted from the base station 1 are not received, rendering accurate tracking and guiding of the object 5 difficult. In such events, multiple optical transmitters 9, 11 and optical uplink receivers 8 are advantageously provided on the object 5, which transmitters/receivers 9, 11, 8 are arranged such that they combined are capable of transmitting/receiving light in a wider scope.

The guidance system is preferably configured to be able to track and guide multiple objects 5. In case the target is a moving target, and all objects 5 are estimated to reach their end positions at different time points, each object 5 will be guided towards an individual end position. The signals carried by the light beams 42, 44 of the optical communication link is preferably then multiplexed to convey information to multiple objects 5 on a single optical communication link. Examples of well-known multiplexing techniques suitable for this purpose are time-division multiplexing and code-division multiplexing. Moreover, when the object 5 is provided with separate optical transmitters 9, 11 for said two functions of communication and angle positioning vector determination, also the optical transmitter 9 for the angle positioning vector determination need some kind of individual identification, for example an individual identity transmit code or frequency/colour specific for that object 5.

When simultaneously guiding and tracking multiple objects 5, a separate optical downlink receiver 12, such as a photo detector, is preferably provided on the base station 1, and used as optical downlink receiver 12 in the optical communication link. The transmitting information 19 from the optical uplink transmitter 7 would then be transmitted to the separate optical receiver 12 to perform said range calculation. An advantage of using a separate optical downlink receiver 12 for the downlink communication means is the possibility to use higher sampling rates, and thus also higher communication speed, than otherwise possible using the optical imaging system 3 as optical downlink receiver. As a result, multiple objects 5 can be guided and tracked with higher accuracy of the measured range to the objects 5.

The guidance system according to the invention preferably also comprises a control system 20 for tracking and guiding the object 5. The control system 20 preferably includes an object tracker 21, which based upon angle position vector information 18 of the object 5 continuously received from the optical imaging system 3 estimates object information 26 of the object 5, such as position, heading, and speed of said at least one object 5 on a continuous basis. The object tracker 21 preferably also receives range information 18, 25 of the object 5 measured either by the optical imaging system 3, or the separate downlink receiver 12.

The object information 26 estimated by the object tracker 21 is subsequently delivered to an object controller 22, which produces guidance control commands 29 for said object 5 based upon said received estimated object information 26, and operator information 31 from an operator 2, such as object launch acknowledgment, navigation commands, and emergency interruption of launched object 5. The object controller 22 might also control other functions of the object 5. For example, in case the object 5 is a weapon, the object controller 22 can control the point of time of detonation based upon the estimated weapon position and target position, thereby eliminating the need for other expensive solutions for this purpose, such as a proximity fuse.

The control system 20 preferably also comprises a target tracker 23, which continuously supplies the object controller 22 with estimated target information 27, such as target position, target speed, and target heading of the target For this purpose, the target tracker 23 continuously receives target angle position vector information 32 from said optical imaging-system 3, preferably operator information 31 from the operator 2 such as target selection, and preferably also target range information 28 from the laser range finder 10.

Preferably, the object tracker 21 comprises a tracking filter for tracking the object 5, and the target tracker 23 comprises a tracking filter for tracking the target, which tracking filters can be nonlinear state estimation filters, for example extended Kalman filters or a particle filters.

The control system will thus continuously respond to dynamic changes of the object 5 and target, and send correction commands to adjust the path of the object 5 in case the end position of the object 5 is no longer estimated to coincide with the position of the target.

Preferably, the orientation of the optical sight 30 including the optical imaging system 3, the laser range finder 10, and the optical communication link is automatically controlled to always aim at the target location, for example controlled by target tracker 23. The operator 2 can follow the course of events on display means, which receives object and target angle position vector information 34 from the optical imaging system 3.

In case the object 5 is launched by a launching device 24, for example artillery or a rocker launcher, the target tracker 23 preferably also, prior to launch, based upon said target information 27, and object characteristic, such as speed, range, maneuverability, etc, determines launch information 33, such as suitable launch direction of the object 5, and a suitable time point of launch. In case the object 5 is a projectile, the target tracker 23 also determines a preliminary ballistic trajectory. Subsequently, the target tracker 23 transmits the determined launch information 33 to said weapon launching device 24. Optionally, the weapon launching device 24 also receives operator information 31 from the operator 2, for example launch acknowledgement to avoid any risk of erroneous launch.

Figure 2:
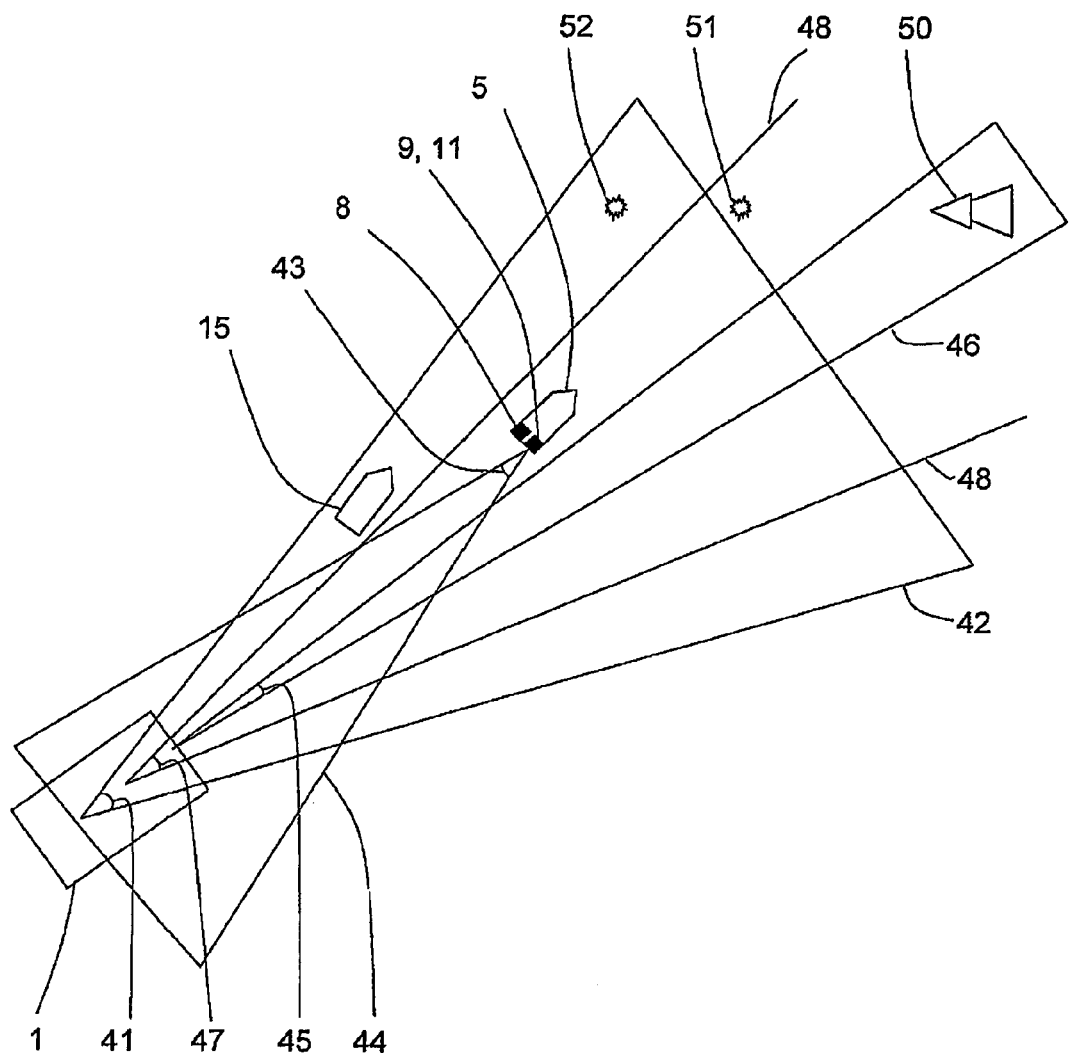
FIG. 2 shows the locations of the base station, two objects and a target, as well as their light beams during guiding and tracking of the guidance system according to the invention.

FIG. 2 illustrates schematically the base station 1, and a first and second object 5, 15 in their in-flight trajectory towards individual end positions 51, 52, where each object 5, 15 is controlled to coincide with the position of a moving target 50, for example an airplane. The base station continuously tracks the position of the target 50 and of the first and second objects 5, 15, and transmits guidance control commands to said objects 5, 15, continuously taking into account any variables that influence the determined individual end position 51, 52 of each object 5, 15, such as the position, heading and speed of the target 50, position, heading, and speed of said objects 5, 15, and the like.

FIG. 2 further schematically illustrates the light beams 42, 44 of the optical communication link, and the light beam 46 of the laser range finder 10, as well as the angle of view 47 of the optical imaging system 3. Said angle of view 47 being defined as the angle between limiting lines 48, which delimit the scope of view of said optical imaging system 3. The first object 5 comprises an optical uplink receiver 8, and an optical transmitter 9, 11, which emits a light beam 44. The light beam of the second object 15 illustrated closest to the base station 1 is not shown.

Each optical transmitter 7, 9, 11 of the optical communication link are configured to emit light with a pre-determined beam angle 41, 43. The selection of the beam angle 41, 43 for each optical transmitter 7, 9, 11 is based upon the type of use the guidance system is configured for, such that the light beams 42, 44 substantially always covers the corresponding receiver 8, 3, 12 during the trajectory of the first and second object 5, 15 toward their individual end positions 51, 52.

For example, the beam angle 41 of the optical uplink transmitter 7 is selected such that uplink light beam 42 substantially always covers all objects 5, 15 to be tracked and guided by the guidance system. The direction of the uplink light beam 42 is preferably fixed at the target position 50, and might thus follow the target position 50 in case the target is moving and/or the guidance system is moving. However, the direction of the uplink light beam 42 might alternatively be fixed to one of the objects 5, 15, or simply be fixed relative the guidance system. Consequently, a suitable beam angle 41 is selected depending on the type of beam direction control applied, and the estimated position/trajectory of the target 50 and the estimated trajectory of the objects 5, 15 during the estimated guidance period.

The beam angle 43 of the light beam 44 emitted by the optical transmitter 9, 11 is selected in a similar manner, taking into account the estimated trajectory of the first object 5, the estimated direction of said light beam 44, and the estimated position of the corresponding optical receiver 3, 12 of the base station 1 during the estimated guidance period.

The beam angle 45 of the laser range finder beam 46 is selected to optimally measure the range to the target 50 taking into account the estimated position/trajectory and size of the target 50 during the estimated guidance period.

The beam angles 41, 43, 45 of the light beams 42, 44, 46 of the optical uplink transmitter 7, the optical transmitter 9, 11, and the laser range finder 10 can be adjusted by optical lenses. The optical lens system 4 determines the beam angle 41 of the light beam 42 emitted by the optical uplink transmitter 7, and optionally also the beam angle 45 of the light beam 46 transmitted by the laser range finder 10.

The optical imaging system 3 receives light via the optical lens system 4, which is provided with a set of lenses to provide a suitable angle of view 47 of the optical imaging system 3. Said angle of view 47 is selected in a manner similar to the beam angle 41 of the light beam 42 emitted by the optical uplink transmitter 7, namely depending on the type of vision direction control applied, the estimated position/trajectory of the target 50 and the estimated trajectory of the objects 5, 15 during the estimated guidance period.

Preferably, the sight 30 is a unit in which the optical uplink transmitter 7, the optical downlink receiver 8, the optical imaging system 3, and the laser range finder 10 are arranged. Preferably, they all use the same optical lens system 4, and their light beams 42, 46 and axis of scope of view are all oriented aligned in the same direction. Furthermore, the optical lens system 4 is preferably provided with a variable-focus lens system to assure that the objects 5, 15 are always illuminated by the optical uplink transmitter 7, and to assure that the optical imaging system 3 always receives the light emitted by the optical transmitter 9, 11 on each object 5, 15.

According to an aspect of the invention, it might however when guiding the objects 5, 15 towards a moving target 50 be advantageously to deviate the direction of the optical communication link, i.e. the orientation of light beam 42 emitted by the optical uplink transmitter 7, and the scope of view of the optical downlink receiver 12 away from the axis of the optical imaging system 3, and towards the objects 5, 15, because the objects 5, 15 will during their trajectory towards a moving target 50 likely not travel directly towards the position of the target 50, but instead heading for the determined individual end positions 51, 52, where the objects 5, 15 are estimated to coincide with the position of the target 50. Hence, the light beam 42 emitted by the optical uplink transmitter 7, and the scope of view of the optical downlink receiver 12 would thus better cover the trajectory of the objects, which would lead to improved communication with and range measurement of the objects 5, 15.

The term angular position vector of the object 5, 15 or target 50 is herein defined as the angular position vector to the object 5, 15 or target 50 with respect to a fixed three dimensional orthogonal coordinate system, such as the spherical coordinate system, which preferably is fixed relative to the horizon, and having the origin at the location of the base station 1. The angular position vector is preferably defined by azimuth and elevation angles to the apparent position of an object 5, 15, relative to said coordinate system.

So far, the detailed description of invention and the mode for carrying out the invention has been mainly disclosed with respect to guidance and tracking of one or more objects, each toward an individual end position, where said object coincides with the position of a target. The invention is however equally suitable for guiding and tracking multiple objects toward multiple moving or stationary targets.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A guidance system for tracking and guiding at least one object (5, 15), said guidance system comprising:
    a base station (1) including an optical imaging system (3) configured to determine the angular position vector of said at least one object (5, 15);
    an optical communication link for transmitting guidance control commands from said base station (1) to said at least one object (5, 15), said optical communication link comprising at least one optical uplink transmitter (7) located on said base station (1) and at least one optical uplink receiver (8) located on said at least one object (5, 15); and
    steering means provided on said at least one object (5, 15) for adjusting the direction of said at least one object (5, 15) in response to said guidance control commands,
    wherein:
        said optical communication link further includes downlink communication means comprising at least one optical transmitter (11) located on said at least one object (5, 15) and at least one optical downlink receiver (3, 12) located on said base station;
        said optical communication link is configured to measure the range to said at least one object (5, 15) by calculating the elapsed time between the sending of an interrogator signal from said at least one optical uplink transmitter (7) and the receipt of a return signal from said at least one optical transmitter (11).

2. The guidance system according to claim 1, wherein:
    said guidance system is suitable for tracking and guiding at least one object (5, 15) to an individual end position (51, 52); and
    said at least one object (5, 15) is estimated to coincide with the position of at least one target (50).

3. The guidance system according to claim 2, wherein said optical imaging system (3) further is configured to determine the angular position vector of said at least one target (50), and said base station (1) further comprises a laser range finder (10) configured to determine the range to said at least one target (50).

4. The guidance system according to claim 2, wherein said guidance system is configured to track and guide multiple objects (5, 15), wherein each of said multiple objects (5, 15) is guided towards an individual end position (51, 52) determined for each individual object (5, 15).

5. The guidance system according to claim 1, wherein:
    said base station (1) further comprises an optical lens system (4); and
    said optical imaging system (3) comprises an image sensor configured to detect light received through said optical lens system (4).

6. The guidance system according to claim 5, wherein said detected light is infrared IR light.

7. The guidance system according to claim 5, wherein said optical imaging system (3), said optical communication link, and said laser range finder (10) are each configured to use the same optical lens system (4).

8. The guidance system according to claim 1, wherein:
    at least one optical transmitter (9) is provided on said at least one object (5, 15); and
    said at least one optical transmitter (9) is configured to emit a light beam (44) detectable by said optical imaging system (3).

9. The guidance system according to claim 8, wherein the at least one optical transmitter (9) is selected from the group consisting of an IR radiation source, a LED transmitter, and a laser transmitter.

10. The guidance system according to claim 8, wherein:
    said at least one optical transmitter (9) is at least one of a laser transmitter and a LED transmitter; and
    at least one of the laser transmitter and the LED transmitter are located on said at least one object (5, 15) and function both as said at least one optical transmitter (9) for emitting a light beam (44) detectable by said optical imaging system (3) and as said at least one optical transmitter (11) of said optical communication link.

11. The guidance system according to claim 1, wherein said at least one optical uplink transmitter (7) is at least one of a laser transmitter and a LED transmitter.

12. The guidance system according to claim 11, wherein said laser transmitter is a laser diode.

13. The guidance system according to claim 1, wherein said at least one optical transmitter (11) is at least one of a laser transmitter and a LED transmitter.

14. The guidance system according to claim 13, wherein said laser transmitter is a laser diode.

15. The guidance system according to claim 1, wherein said at least one optical transmitter (11) of said at least one object (5, 15) is configured to emit a light beam (44) covering the location of said optical downlink receiver (3, 12) during the trajectory of said at least one object (5, 15).

16. The guidance system according to claim 1, wherein:
    said at least one object (5, 15) is a weapon, said weapon comprising at least one of a projectile, a bomb, a rocket, and a missile; and
    said steering means comprises at least one of a vector control, an impulse rocket, and an aerodynamic steering means.

17. The guidance system according to claim 16, wherein said aerodynamic steering means comprises as at least of a rudder, a ram air system, and an air deflecting means.

18. The guidance system according to claim 16, wherein said guidance system further comprises a control system (20), said control system comprising:
    an object tracker (21), which receives object angle position vector information from said optical imaging system (3) and object range information from said optical communication link, said object tracker (21) being configured to estimate object information (26); and
    an object controller (22) configured to produce guidance control commands for at least one object (5, 15) based upon at least one of corresponding estimated object information (26) and operator information (31).

19. The guidance system according to claim 18, wherein object information (26) comprises at least one of object position, object heading, and object speed.

20. The guidance system according to claim 18, wherein:
    said control system (20) further comprises a target tracker (23), which receives target angle position vector information (32) from said optical imaging system (3) and target range information (28) from said laser range finder (10);
    said target tracker (23) is configured to estimate target information (27); and said target information (27) is supplied to the object controller (22).

21. The guidance system according to claim 20, wherein said target information (27) comprises at least one of a target position, a target speed, and a target heading of said at least one target (50).

22. A guiding method for tracking and guiding at least one object (5, 15), wherein said guiding method comprises the steps of:
   providing an optical communication link comprising:
   (i) at least one optical uplink transmitter (7) located on a base station (1);
   (ii) at least one optical uplink receiver (8) located on said at least one object (5, 15);
   (iii) downlink communication means comprising at least one optical transmitter (11) located on said at least one object (5, 15); and
   (iv) at least one optical downlink receiver (3, 12) located on said base station (1);
   determining the angular position vector of said at least one object (5, 15) by means of an optical imaging system (3) located on a base station (1);
   measuring a range to said at least one object (5, 15) by means of said optical communication link by calculating the elapsed time between the sending of an interrogator signal from said at least one optical uplink transmitter (7) and the receipt of a return signal from said at least one optical transmitter (11);
   transmitting guidance control commands from said base station (1) to said at least one object (5, 15) by means of an optical communication link; and
   steering said at least one object (5, 15) in response to said guidance control commands by means of steering means provided on said at least one object (5, 15).

* * * * *